United States Patent
Akiyoshi

(10) Patent No.: US 8,718,012 B2
(45) Date of Patent: May 6, 2014

(54) MOBILE COMMUNICATION SYSTEM, METHOD OF HANDOVER BETWEEN DIFFERENT TYPES OF ACCESS NETWORKS, MOBILE TERMINAL, AND SERVER

(75) Inventor: Ippei Akiyoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 383 days.

(21) Appl. No.: 12/919,550

(22) PCT Filed: Mar. 27, 2009

(86) PCT No.: PCT/JP2009/056364
§ 371 (c)(1),
(2), (4) Date: Aug. 26, 2010

(87) PCT Pub. No.: WO2009/119833
PCT Pub. Date: Oct. 1, 2009

(65) Prior Publication Data
US 2011/0007709 A1   Jan. 13, 2011

(30) Foreign Application Priority Data

Mar. 28, 2008  (JP) .................................. 2008-086169

(51) Int. Cl.
*H04W 4/00*   (2009.01)
*H04W 36/00*   (2009.01)

(52) U.S. Cl.
CPC ...... *H04W 36/0066* (2013.01); *H04W 36/0061* (2013.01)
USPC ........................................................ 370/331

(58) Field of Classification Search
CPC ................................................ H04W 36/0066
USPC ........................................................ 370/331
See application file for complete search history.

(56) References Cited

U.S. PATENT DOCUMENTS

2009/0109925 A1* 4/2009 Nakamura et al. ............ 370/331

FOREIGN PATENT DOCUMENTS

| CN | 1813484 A | 8/2006 |
| CN | 1947360 A | 4/2007 |

(Continued)

OTHER PUBLICATIONS

International Search Report for PCT/JP2009/056364 mailed Jun. 30, 2009.

(Continued)

*Primary Examiner* — Mark Rinehart
*Assistant Examiner* — Maharishi Khirodhar
(74) *Attorney, Agent, or Firm* — Sughrue Mion, PLLC

(57) ABSTRACT

Because attachment processing is executed as a trigger of handover between different types of access networks by the Proxy MIP, not only link set-up but also various processing including authentication processing and IP acquisition processing are required to make a handover time longer.
A mobile communication system that accommodates different types of access networks, which includes an IWK device 60 having a unit which manages information of correspondence between a base station ID for identifying a base station of an access network of a handover destination and a virtual base station ID for identifying the base station in an access network of a handover source whose ID space is different and a unit which executes protocol conversion based on the correspondence information, and a mobile terminal 50 having a unit which solves a virtual base station ID from a base station ID and a unit which executes handover between different types of access networks by using the virtual base station ID.

6 Claims, 11 Drawing Sheets

(56) References Cited

FOREIGN PATENT DOCUMENTS

| | | | |
|---|---|---|---|
| JP | 2007528661 | A | 10/2007 |
| JP | 2009124684 | A | 6/2009 |
| WO | 2008018151 | A | 2/2008 |

OTHER PUBLICATIONS

3GPP TS 23.402 V.1.2.1, Technical Specification Group Services and System Aspects: Architecture Enhancement for non-3GPP accesses (Release 8), Aug. 2007.

Chinese search report for CN2009801069942 dated Dec. 3, 2012.

* cited by examiner

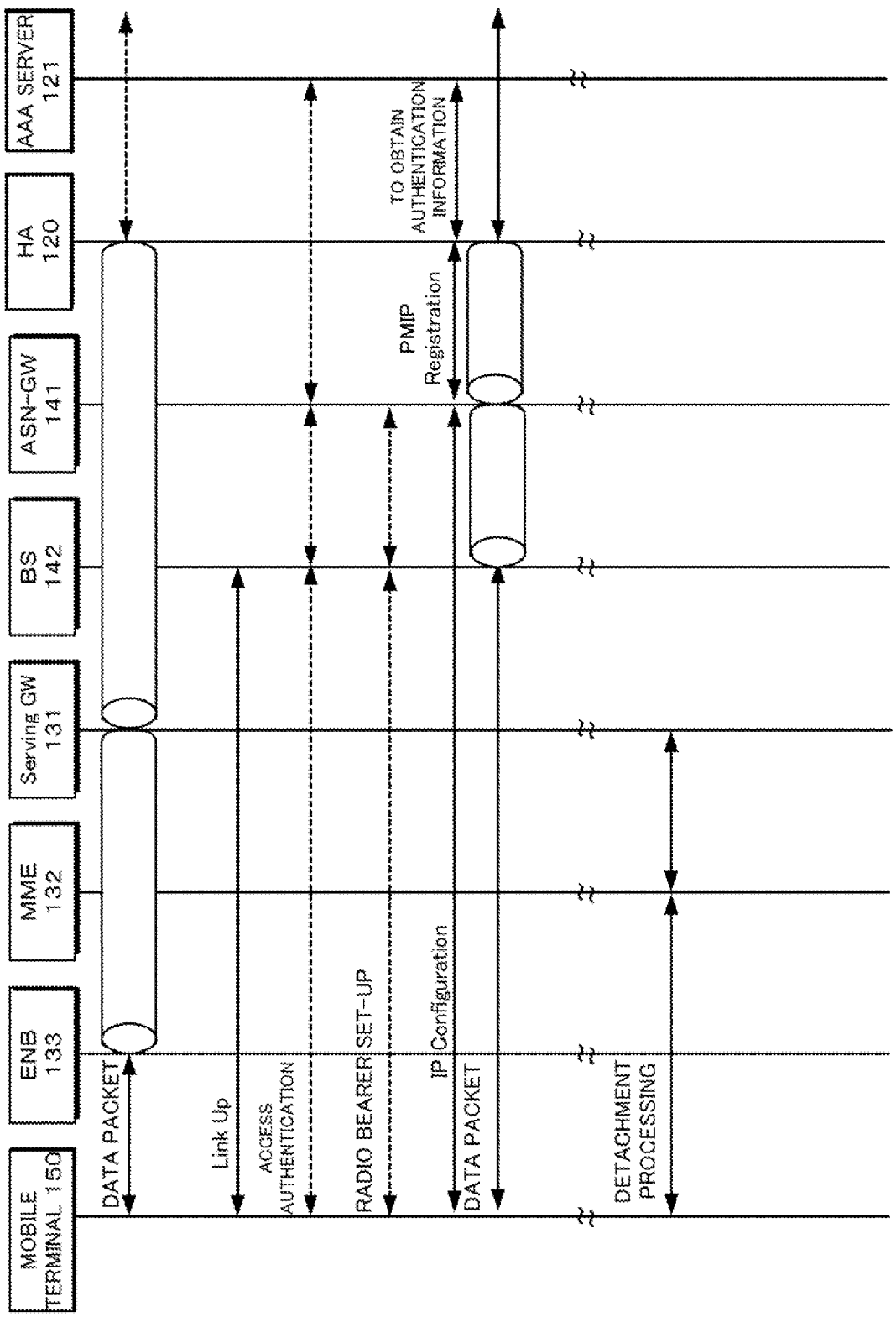

MOBILE COMMUNICATION SYSTEM, METHOD OF HANDOVER BETWEEN DIFFERENT TYPES OF ACCESS NETWORKS, MOBILE TERMINAL, AND SERVER

INCORPORATION BY REFERENCE

This application is the National Phase of PCT/JP20091056364, filed Mar. 27, 2009, which is based upon and claims the benefit of priority from Japanese patent application No. 2008-086169, filed on Mar. 28, 2008, the disclosure of which is incorporated herein in its entirety by reference.

TECHNICAL FIELD

The present invention relates to a mobile communication system which accommodates different types of access networks, a method of handover between the different types of access networks and a program thereof, and more particularly, a mobile communication system and a method of handover between different types of access networks which enable cooperation in the Layer 2 while minimizing effects caused by alteration of an existing access network.

BACKGROUND ART

An example of related art of a mobile communication system accommodating different types of access networks is recited in Non-Patent Literature 1.

As shown in FIG. 10, the mobile communication system recited in Non-Patent Literature 1 comprises a mobile network 1 and a mobile terminal 150.

The mobile network 1 comprises an HA (Home Agent) 120, an AAA (Authentication, Authorization and Accounting) server 121, an LTE (Long Term Evolution) network 111 and a WiMAX (Worldwide Interoperability for Microwave Access) network 112.

The LTE network 111, which is an access network for next-generation cellular radio communication for 3GPP called 4G, comprises a Serving GW (Gateway) 131, an MME (Mobility Management Entity) 132 and an ENB (Evolved-UTRAN Node B) 133. The Serving GW 131 is an anchor node for packet communication in the LTE network 111. The MME 132 is a control server for control signal processing in the LTE network 111. The ENB 133 is a base station for LTE.

The WiMAX network 112, which is an access network to which a radio technique defined by IEEE802.16e that is called 4G is applied, comprises an ASN-GW (Access Service Network Gateway) 141 and a BS (Base Station) 142. The ASN-GW 141 is a control server for control signal processing in the WiMAX network 112 and also an anchor node for packet communication. The BS 142 is a base station for WiMAX.

The HA 120 is an anchor node for continuously executing packet communication even when the mobile terminal 150 executes handover between different types of access networks such as handover (HO) from the LTE network 111 to the WiMAX network 112.

The AAA server 121 is a server for executing authentication and charging of the mobile terminal 150.

The mobile terminal 150, which is a terminal having performance of connection to both of the LTE network 111 and the WiMAX network 112, executes communication by using an IP address belonging to the HA 120.

In handover between different types of access networks in thus structured mobile communication system, operation will be as shown in FIG. 11.

As an initial state, the mobile terminal 150 is assumed to communicate through the LTE network 111.

When determining to execute handover from the LTE network 111 to the WiMAX network 112 because of a change of a radio condition or the like, the mobile terminal 150 first establishes a link with the BS 142.

Subsequently, the mobile terminal 150 sequentially executes access authentication, set-up of a radio bearer and IP address acquisition processing.

Since mobility management between the HA 120 and the ASN-GW 141 is executed by a mobility protocol called Proxy Mobile IP, the ASN-GW 141 registers a position at the HA 120 in linkage with the above-described IP address acquisition processing.

As a result of updating of position information of the mobile terminal 150 which is managed by the HA 120 by this position registration, handover to the WiMAX network 112 is completed.

Lastly, the mobile terminal 150 executes detachment processing with respect to the LTE network 111 not to be used.

Non-Patent Literature 1: 3GPPTS23.402 ver. 1.2.1 "3GPP System Architecture Evolution (SAE): Architecture Enhancements for Non-3GPP Accesses", http://www.3gpp.org/ftp/Specs/html-info/23402.htm.

First problem is that time required for handover processing is long.

The reason is that attachment processing is executed as processing of handover (HO) between different types of access networks. Therefore, not only link establishment but also other lot of processing such as authentication processing and IP acquisition processing is required to result in having a longer handover time.

OBJECT OF THE INVENTION

An object of the present invention is to provide a mobile communication system, a method of handover between different types of access networks, a mobile terminal and a server which enable high-speed handover between different types of access networks by linkage with an L2 technique.

Another object of the present invention is to provide a mobile communication system which enables minimization of effects of alteration exerted on an existing access network which are caused along realization of high-speed handover between different types of access networks.

A further object of the present invention is to provide a mobile communication system, a method of handover between different types of access networks, a mobile terminal and a server which enable high-speed handover between different types of access networks even when the number of radios to which a mobile terminal is allowed to connect simultaneously is one.

SUMMARY

According to a first exemplary aspect of the invention, a mobile communication system which accommodates different types of access networks, includes an interwork device having a unit which manages information of correspondence between a base station ID for identifying a base station of an access network of a handover destination and a virtual base station ID for identifying the base station in an access network of a handover source whose ID space is different, and a unit which executes protocol conversion based on the correspondence information, and a mobile terminal having a unit which solves the virtual base station ID from the base station ID and a unit which executes handover between different types of access networks by using the virtual base station ID.

According to a second exemplary aspect of the invention, a method of handover between different types of access networks in a mobile communication system which accommodates different types of access networks, wherein an interwork device executes protocol conversion based on information about correspondence between a base station ID for identifying a base station of an access network of a handover destination and a virtual base station ID for identifying the base station in an access network of a handover source whose ID space is different, and a mobile terminal solves the virtual base station ID from the base station ID to execute handover between different types of access networks by using the virtual base station ID.

According to a third exemplary aspect of the invention, a mobile terminal which connects to a different type of access network on a mobile communication system which accommodates different types of access networks, includes a unit which solves, from a base station ID for identifying a base station of an access network of a handover destination, a virtual base station ID for identifying the base station in an access network of a handover source whose ID space is different, and a unit which executes handover between different types of access networks by using the virtual base station ID.

According to a fourth exemplary aspect of the invention, a server on a mobile communication system which accommodates different types of access networks, includes a unit which manages information of correspondence between a base station ID for identifying a base station of an access network of a handover destination and a virtual base station ID for identifying the base station in an access network of a handover source whose ID space is different, and a unit which returns virtual base station ID information in response to an inquiry from the mobile terminal.

First effect is enabling high-speed handover between different types of access networks.

The reason is that even when an access system for use changes before and after handover, executing protocol conversion enables handover to be executed with signaling occurring in an access network of a handover source as a trigger.

Second effect is enabling minimization of effects of alteration exerted on an existing access network which are caused along realization of high-speed handover between different types of access networks.

The reason is that introduction of a virtual base station ID prevents an existing base station or a gate way in an access network from requiring alteration for processing a base station ID used in other access network.

BRIEF DESCRIPTION OF THE DRAWINGS

FIG. 11 is a sequence diagram at the time of handover between different types of access networks according to the related art.

EXEMPLARY EMBODIMENT

Next, exemplary embodiments according to the present invention will be described in detail with reference to the drawings.

First Exemplary Embodiment

Figure 1:
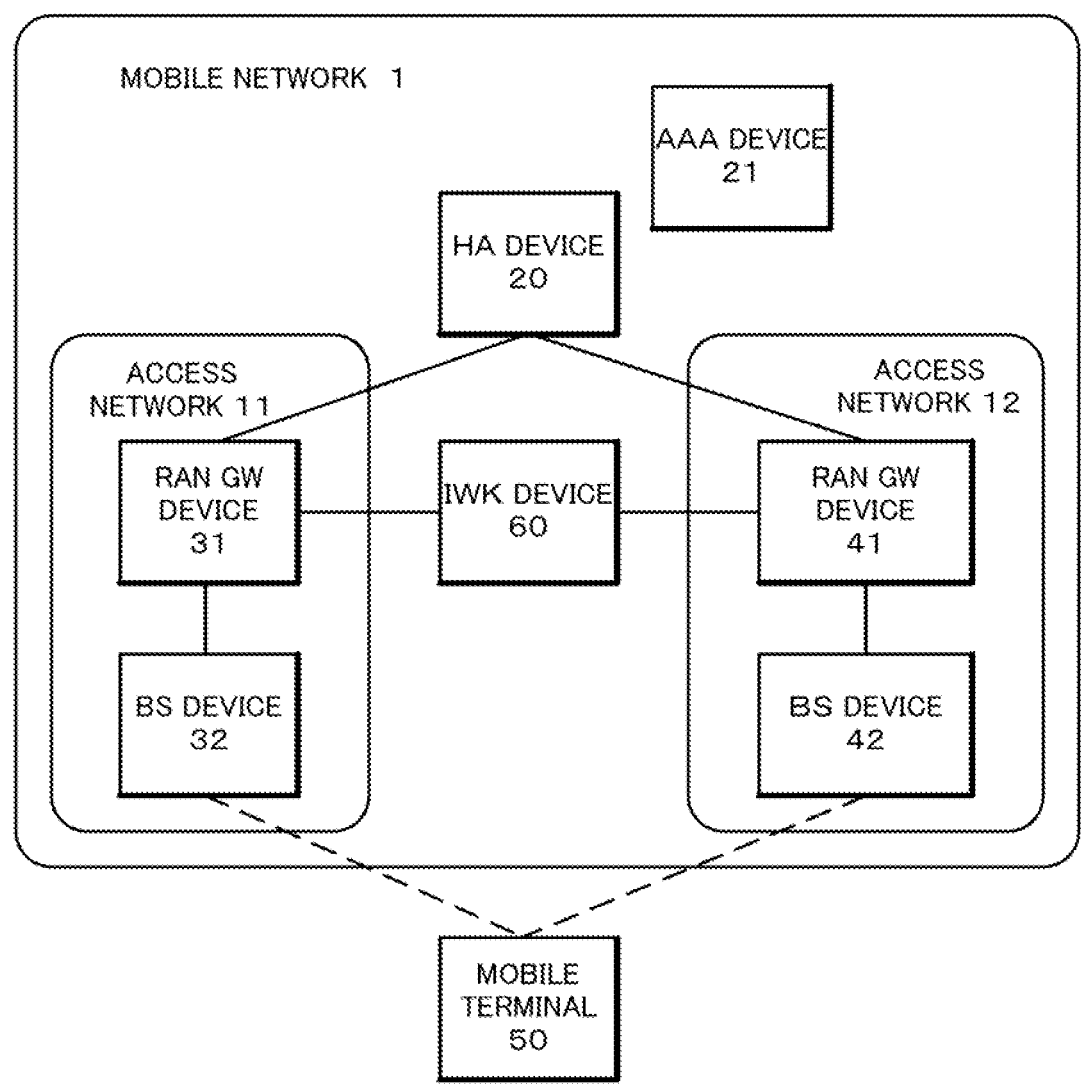
FIG. 1 is a block diagram showing a structure of a first exemplary embodiment according to the present invention.

With reference to FIG. 1, a first exemplary embodiment of the present invention comprises a mobile network 1 and a mobile terminal 50.

The mobile network 1 comprises an HA (Home Agent) device 20, an AAA (Authentication, Authorization and Accounting) device 21, access networks 11 and 12 and an IWK (Inter Working) device 60.

The access networks 11 and 12, which are access networks to which different types of radio systems are applied, comprise RAN GW (Radio Access Network Gateway) devices 31 and 41 and BS (Base Station) devices 32 and 42, respectively.

The RAN GW devices 31 and 41 each have a control server function for control signal processing in the access networks 11 and 12, respectively, an anchor function for packet communication and a function of registering a position at the HA device 20 by using the Proxy Mobile IP.

While the control server function for control signal processing and the anchor function for packet communication are provided in one entity called a RAN GW function in the present mode of implementation, the above-described functions may be mounted on another entity depending on an access system.

The BS devices 32 and 42 are base stations for use in the access networks 11 and 12, respectively. To the BS devices 32 and 42, a base station ID for unitarily identifying a BS device on an access network basis is assigned. Since the base station ID is in general managed on an access system basis, it cannot be used in a different access network.

The HA device 20 is an anchor node for continuously executing packet communication even in a case where the mobile terminal 50 executes handover between different types of access networks such as a case of handover (HO) from the access network 11 to the access network 12.

The AAA device 21 is a server device for executing authentication and charging of the mobile terminal 50.

The mobile terminal 50, which is a terminal having performance of connection to both of the access networks 11 and 12, executes communication by using an IP address belonging to the HA device 20. The mobile terminal 50 has a conversion function of solving a virtual base station ID from a base station ID.

By this conversion function, the mobile terminal 50 converts a base station ID of a handover destination whose ID space is different from that of a base station ID for use in an access network of a handover source into a virtual base station ID usable in the access network of the handover source.

Here, description will be made of the conversion function that the mobile terminal 50 has.

Possible in the conversion function are a system (1) of solving a virtual base station ID by a conversion rule using a conversion formula and a system (2) of solving a virtual base station ID by using a conversion table (mapping information).

(1) System Using Conversion Formula

In the system using a conversion formula, prepared is a conversion formula taking into consideration structures of 3GPP Cell ID and WiMAX BSID shown in the following.

3GPP Cell ID=MCC+MNC+LAC+CI

WiMAX BS ID=NAP ID+BS unique ID

Here, MCC is an abbreviation of a Mobile Country Code, which is, in this case, an ID (three digits in a decimal system) for identifying a country where a terminal exists.

MNC is an abbreviation of a Mobile Network Code, which is, in this case, an ID (two or three digits in a decimal system) for identifying a network to which a terminal connects.

LAC is an abbreviation of a Local Area Code, which is, in this case, an ID (two bytes) for identifying an area (area which covers a plurality of BSs) where a terminal exists.

CI is an abbreviation of a Cell Identity, which is, in this case, an ID (two bytes) for identifying a BS to which a terminal connects or a BS to which handover is to be made.

NAP ID is an ID (three bytes) which in this case identifies an operator that manages an access network to which a terminal connects.

BS unique ID is an ID (three bytes) which in this case identifies a BS to which a terminal connects or a BS to which handover is to be made.

NAP ID+BS unique ID makes a global unique ID.

A conversion formula for solving a virtual base station ID from a base station ID is therefore premised on that a terminal in advance recognizes a correspondence relationship set forth below by preconfiguration or the like.

MCC+MNC⇔NAP ID         (1)

Then, since a length of LAC+CI is 4(2+2) bytes and a length of a BS unique ID is three bytes, holding the following conversion expression (2) by a terminal enables conversion of LAC+CI⇔BS unique ID.

LAC+CI=0x0000+BS unique ID         (2)

From the foregoing, combining the Expression (1) and the Expression (2) enables solution of a virtual base station ID from a base station ID.

(2) System Using Conversion Table (Mapping Information)

This system solves a virtual base station ID from a base station ID by simply using the above-described conversion tables which recite the correspondence relationship between 3GPP Cell ID and WiMAX BS ID. One of the conversion tables will be a real base station ID and the other will be a virtual base station ID.

The IWK device 60 has a function of converting a protocol used in the access network 11 and a protocol used in the access network 12. The IWK device 60 holds mapping information which correlates a base station ID and a virtual base station ID for use in the access networks 11 and 12.

Next, with reference to FIG. 1 and the flow chart of FIG. 2, detailed description will be made of operation of handover between different types of access networks from the access network 11 to the access network 12 according to the present mode of implementation.

Figure 2:
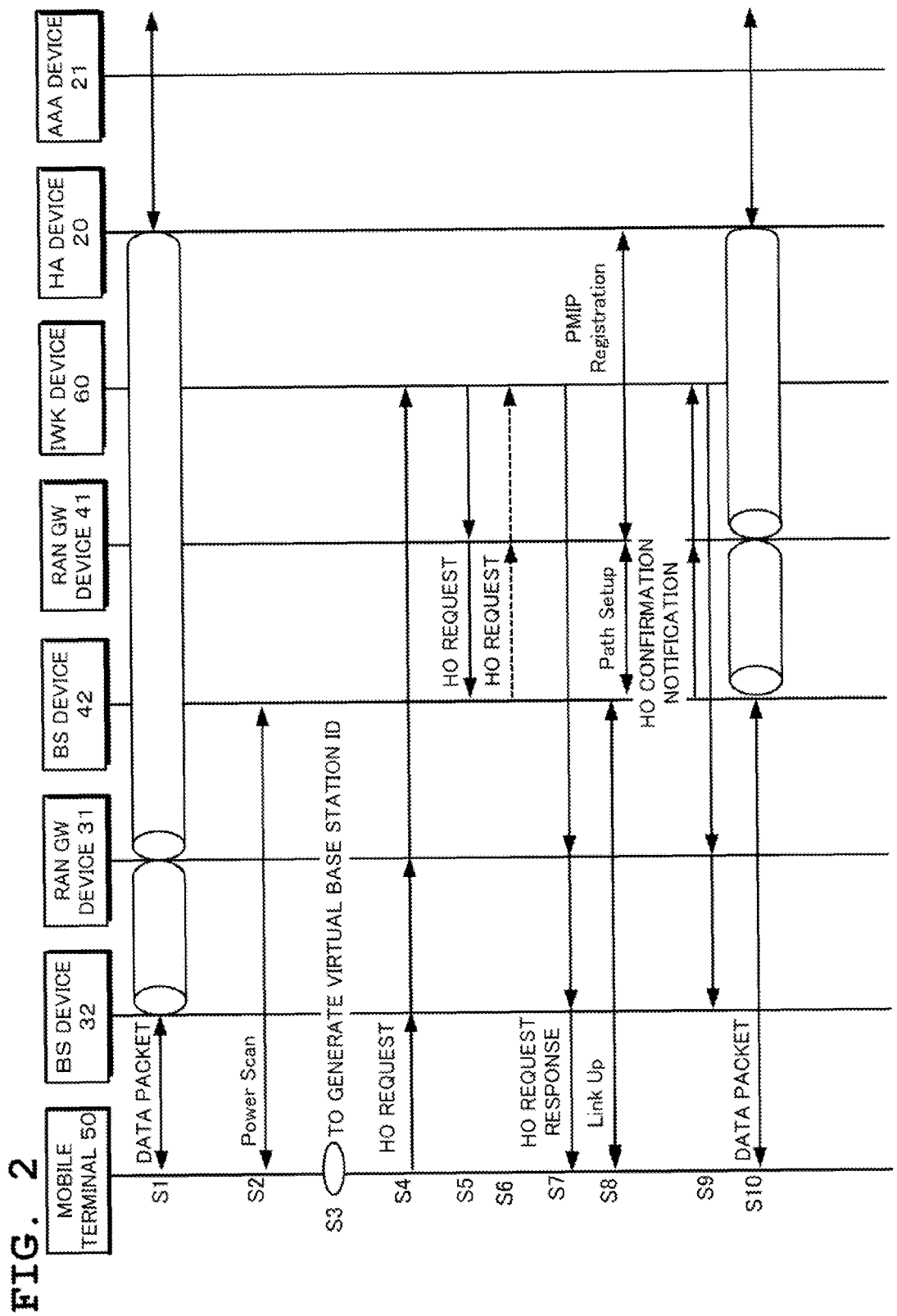
FIG. 2 is a sequence diagram at the time of handover between different types of access networks in the first exemplary embodiment according to the present invention.

In an initial state, the mobile terminal 50 communicates through the access network 11 (Step S1 in FIG. 2).

First, the mobile terminal 50 measures an electric field intensity of a link with an adjacent BS device in order to search for a handover destination candidate (Step S2).

Assume here that as a result of link electric field intensity measurement, the BS device 42 of the access network 12 is newly found as a candidate of a handover destination.

When determining to execute handover between different types of access networks to the BS device 42 based on a link electric field intensity or the like, the mobile terminal 50 generates a virtual base station ID of the BS device 42 from a base station ID of the BS device 42 by its held conversion function in order to obtain a virtual base station ID of the BS device 42 which can be used in the access network 11 (Step S3).

In order to execute handover to the BS device 42, the mobile terminal 50 transmits an HO (handover) request message to the BS device 32 (Step S4). The HO request message includes the virtual base station ID of the BS device 42 obtained at Step S3 as base station information of the handover destination.

Upon receiving the HO request message, the BS device 32 transfers the HO request message to the RAN GW device 31 as its own host anchor node.

The RAN GW device 31 determines that it is handover requiring change of the RAN GW device based on the virtual base station ID of the BS device 42 as handover destination base station information to transmit the HO request message to the IWK device 60.

Here, it is necessary to make the host RAN GW device of the BS device 42 as a base station be seen as the IWK device 60 from the RAN GW device 31.

It is therefore necessary to indicate, in a data base used by the RAN GW device 31 for solving, from the virtual base station ID of the BS device 42, its host RAN GW device, that a host RAN GW device of the base station 42 is the IWK device 60.

Possible as a data base recited here are, for example, a local data base in the RAN GW device 31 and a data base in a DNS server for solving an address of the RAN GW device.

Upon receiving the HO request, the IWK device 60 converts the received HO request message into an HO request message usable in the access network 12 based on its own held conversion rule data base and transmits the obtained message to the RAN GW device 41.

The RAN GW device 41 transfers the received HO request further to the BS device 42 (Step S5).

Upon receiving the HO request message, the BS device 42 returns an HO request response (Step S6).

The HO request response is returned to the mobile terminal 50 through the RAN GW device 41, the IWK device 60, the RAN GW device 31 and the BS device 32 (Step S7).

Upon receiving the 110 request response, the mobile terminal 50 starts connection to the BS device 42 (Step S8).

The BS device 42 transmits a Path Setup message to the RAN GW device 41 in linkage with link set-up with the mobile terminal 50.

The RAN GW device 41 executes position registration at the HA Device 20 by the Proxy Mobile IP.

Lastly, the BS device 42 transmits an HO confirmation notification message to the BS device 32 through the RAN GW device 41, the IWK device 60 and the RAN GW device 31 (Step S9).

As a result of the handover, the mobile terminal 50 communicates through the access network 12 (Step S10).

In the present mode of implementation, with such structure as described above adopted, handover is executed with signaling occurring in an access network as a handover source used as a trigger irrespectively of access systems used before and after the handover.

Effect of the First Exemplary Embodiment

In the present mode of implementation, since handover between different types of access networks is executed by using the IWK device and a virtual base station ID, handover can be executed at a high speed by using L2 cooperation while minimizing an effect on an existing access network.

Second Exemplary Embodiment

Next, a second exemplary embodiment of the present invention will be detailed with reference to the drawings.

Figure 3:
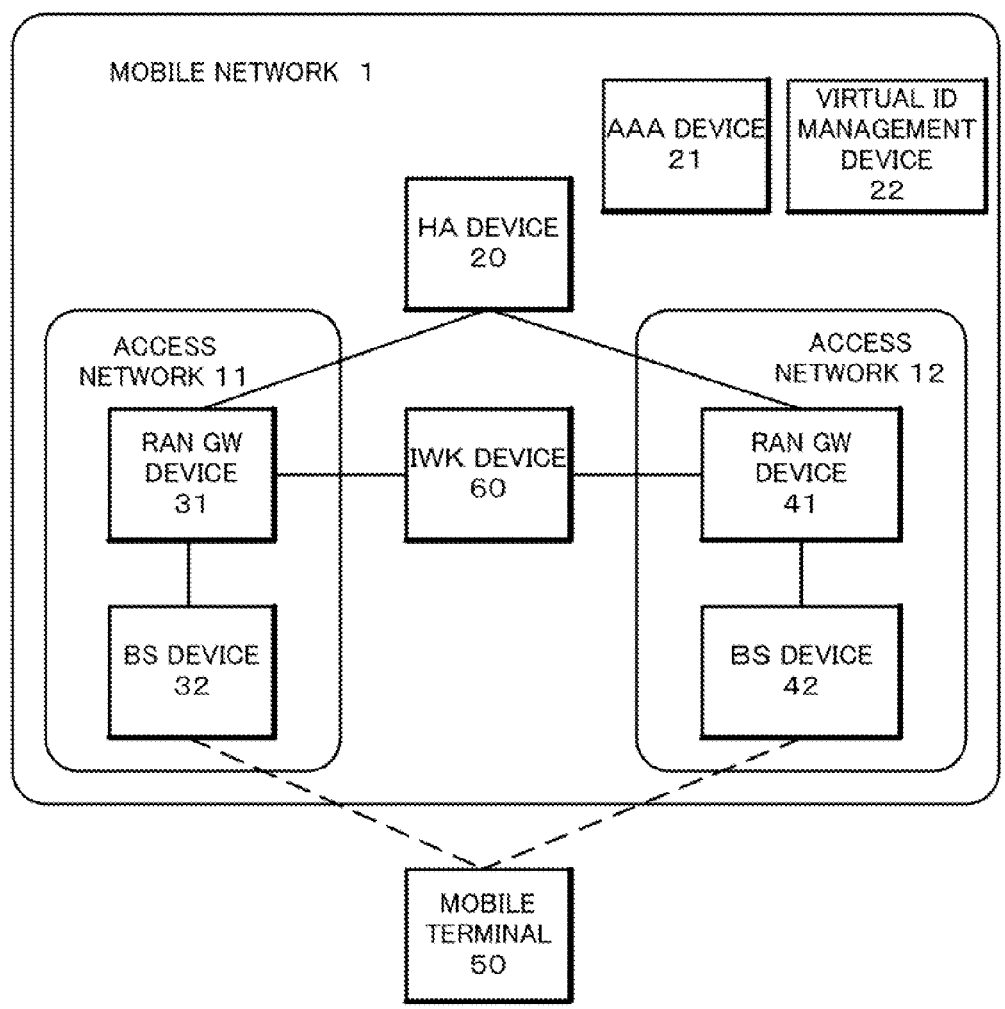
FIG. 3 is a block diagram showing a structure of a second exemplary embodiment according to the present invention.

With reference to FIG. 3, the second exemplary embodiment of the present invention comprises the mobile network 1 and the mobile terminal 50. Difference from the first exemplary embodiment is that a virtual ID management device 22 is added to the mobile network 1.

Since the access networks 11 and 12, the HA device 20, the AAA device 21, the RAN GW devices 31 and 41, the BS devices 32 and 42 and the IWK device 60 are the same as those of the first exemplary embodiment, no detailed description will be made thereof.

The virtual ID management device 22, which is a server device that manages a correspondence relationship between a base station ID used in each access network and a virtual base station ID usable in a different access network, returns a base station ID included in a request message and a virtual base station ID according to information of an access network of a handover source in response to an inquiry from the mobile terminal 50.

The mobile terminal 50, which is a terminal having performance of connection to both of the access networks 11 and 12, executes communication by using an IP address belonging to the HA device 20. The mobile terminal 50 has a client function of inquiring of the virtual ID management device 22 to solve a virtual base station ID from a base station ID.

Next, with reference to FIG. 3 and the flow chart of FIG. 4, detailed description will be made of operation of handover between different types of access networks from the access network 11 to the access network 12 according to the present mode of implementation.

Figure 4:
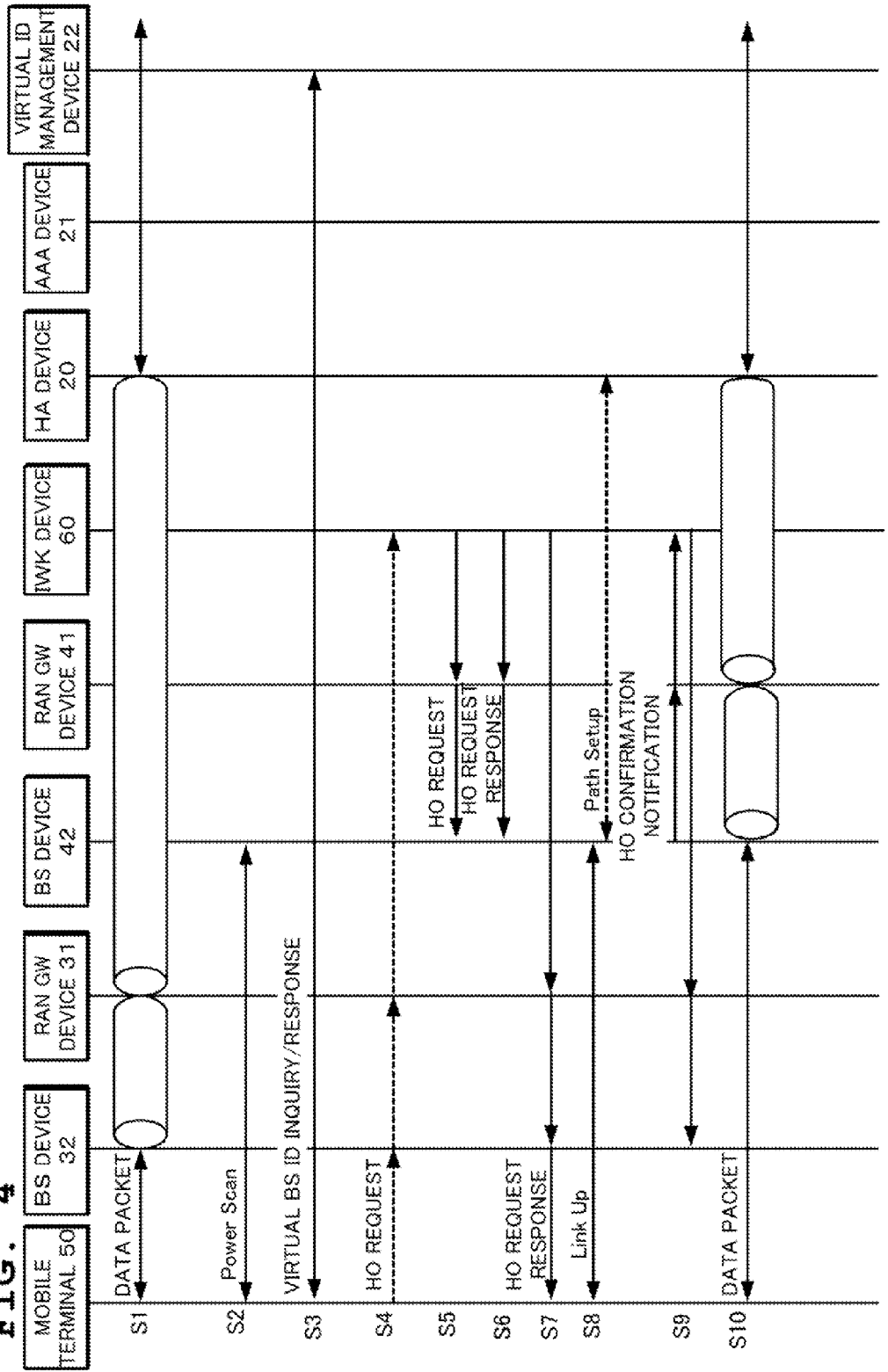
FIG. 4 is a sequence diagram at the time of handover between different types of access networks in the second exemplary embodiment according to the present invention.

Since Steps S1 and S2 in FIG. 4 are the same as the corresponding steps in FIG. 2 according to the firs exemplary embodiment, no description will be made thereof.

When determining execution of handover between different types of access networks to the BS device 42 based on a link electric field intensity or the like, the mobile terminal 50 inquires about a virtual base station ID in order to obtain a virtual base station ID of the BS device 42 which can be used in the access network 12 (Step S3).

The virtual base station ID inquiry message transmitted from the mobile terminal 50 includes, as an information element, a base station ID of the BS device 42 and an access kind of the currently connected access network 11 which is a handover source.

The virtual ID management device 22 searches its own data base for a base station ID and a virtual base station ID according to a kind of access and transmits a response message to the mobile terminal 50.

A method of solving an address of the virtual ID management device 22 by the mobile terminal 50 can be realized by preconfiguration or DHCP at the time of start-up.

Since procedures following Step S4 in FIG. 4 are the same as the procedures in the first exemplary embodiment, no detailed description will be made thereof.

While in the present mode of implementation, every time a new base station ID is found, an inquiry is made to the virtual ID management device 22, information returned by the virtual ID management device 22 may be a correspondence list of areas where the mobile terminal 50 exists. Returning such a correspondence list generates an advantage that the number of inquiries of the virtual ID management device 22 can be reduced.

Effect of the Second Exemplary Embodiment

Next, an effect of the present mode of implementation will be described.

The present mode of implantation attains, in addition to the effect obtained by the first exemplary embodiment, an effect that the mobile terminal 50 needs no management of a conversion rule and a conversion table on an access system basis because of introduction of the virtual ID management device.

EXAMPLE

Next, a first example of the present invention will be described with reference to the drawings. The first example corresponds to the first exemplary embodiments the present invention.

Figure 5:
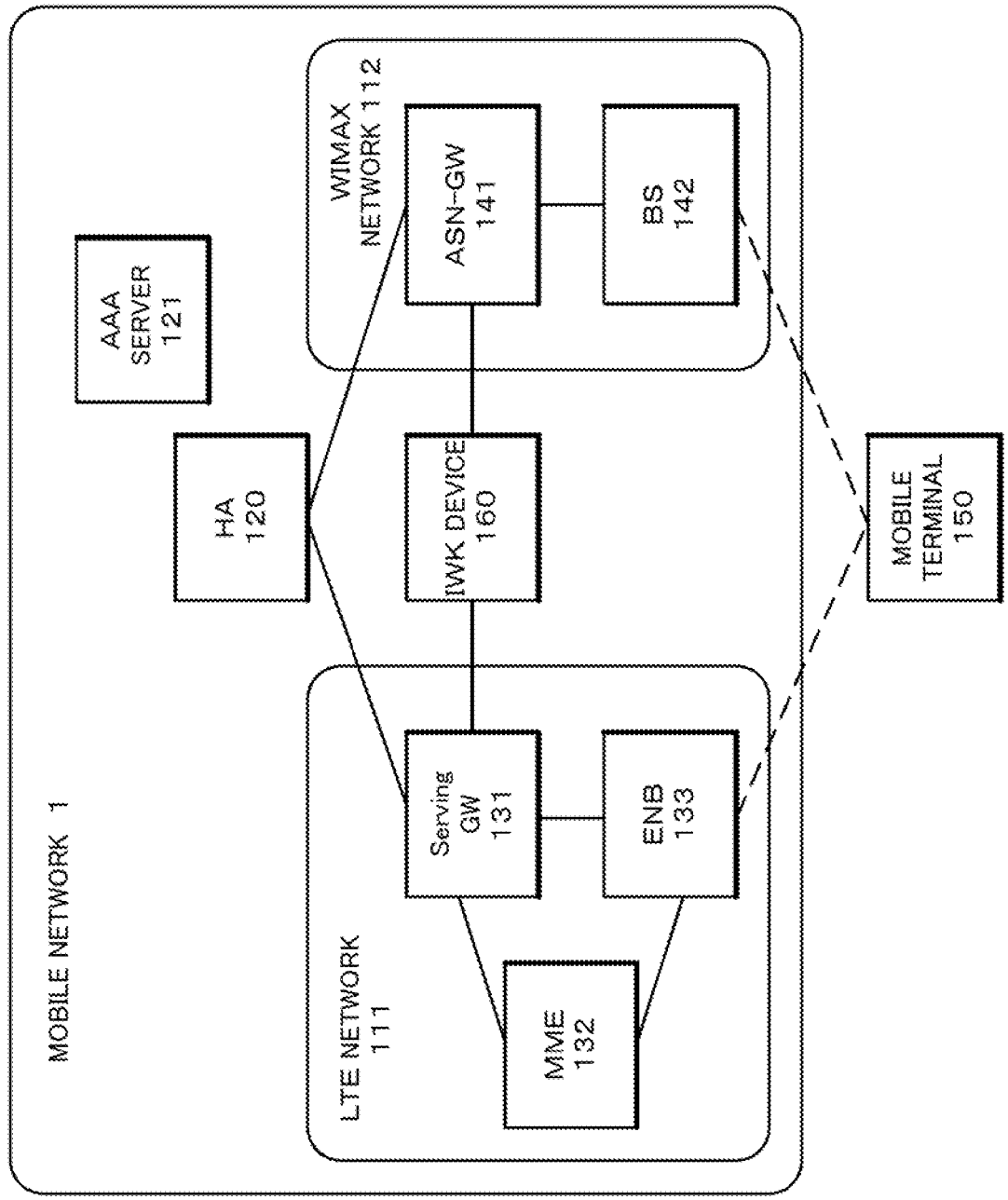
FIG. 5 is a block diagram showing a structure of a first example according to the present invention.

With reference to FIG. 5, the first example of the present invention comprises the mobile network 1 and a mobile terminal 150.

The mobile network 1 comprises an HA (Home Agent) 120, an AAA (Authentication, Authorization and Accounting) server 121, an LTE (Long Term Evolution) network 111, a WiMAX network 112 and an IWK (Interwork) device 160.

The LTE network 111, which is an access network for next-generation cellular radio communication for 3GGP called 4G, comprises a Serving GW 131, an MME (Mobility Management Entity) 132 and an ENB (Evolved-UTRAN Node B) 133.

The Serving GW 131 is an anchor node for packet communication in the LTE network 111. The MME 132 is a control server for control signal processing in the LTE network 111. The ENB 133 is a base station for LTE.

The WiMAX network 112, which is an access network to which a radio technique defined by IEEE802.16e that is called 4G is applied, comprises an ASN-GW (Access Service Network Gateway) 141 and a BS (Base Station) 142.

ASN-GW 141 is a control server for control signal processing in the WiMAX network 112 and also an anchor node for packet communication. The BS 142 is a base station for WiMAX.

The HA 120 is an anchor node for continuously executing packet communication even when handover between different types of access networks is executed by the mobile terminal 150 such as handover from the LTE network 111 to the WiMAX network 112.

The AAA server 121 is a server for executing authentication and charging of the mobile terminal 150.

The mobile terminal 150, which is a terminal having performance of connection to both of the LTE network 111 and the WiMAX network 112, executes communication by using an IP address belonging to the HA 120. The mobile terminal 150 has a conversion function for solving a virtual base station ID from a base station ID.

The IWK device 160 has a function of converting a protocol used in the LTE network 111 and a protocol used in the WiMAX network 112. The IWK device 160 holds mapping information which correlates a base station ID and a virtual base station ID for use in the LTE network 111 and the WiMAX network 112.

Next, with reference to the flow charts of FIG. 6 and FIG. 7, detailed description will be made of operation of handover between different types of access networks from the WiMAX network 112 to the LTE network 111 according to the present exemplary embodiment.

The present handover takes a two-stage procedure, Preparation Phase and Action Phase.

Here, the Preparation Phase is a procedure for obtaining information about a basic station (ENB in the LTE network 111 and BS in the WiMAX network 112) that a mobile terminal is allowed to handover and the Action Phase is a procedure for a mobile terminal to execute handover in practice. Procedures of the Preparation Phase are shown in FIG. 6 and procedures of the Action Phase are shown in FIG. 7.

Figure 6:
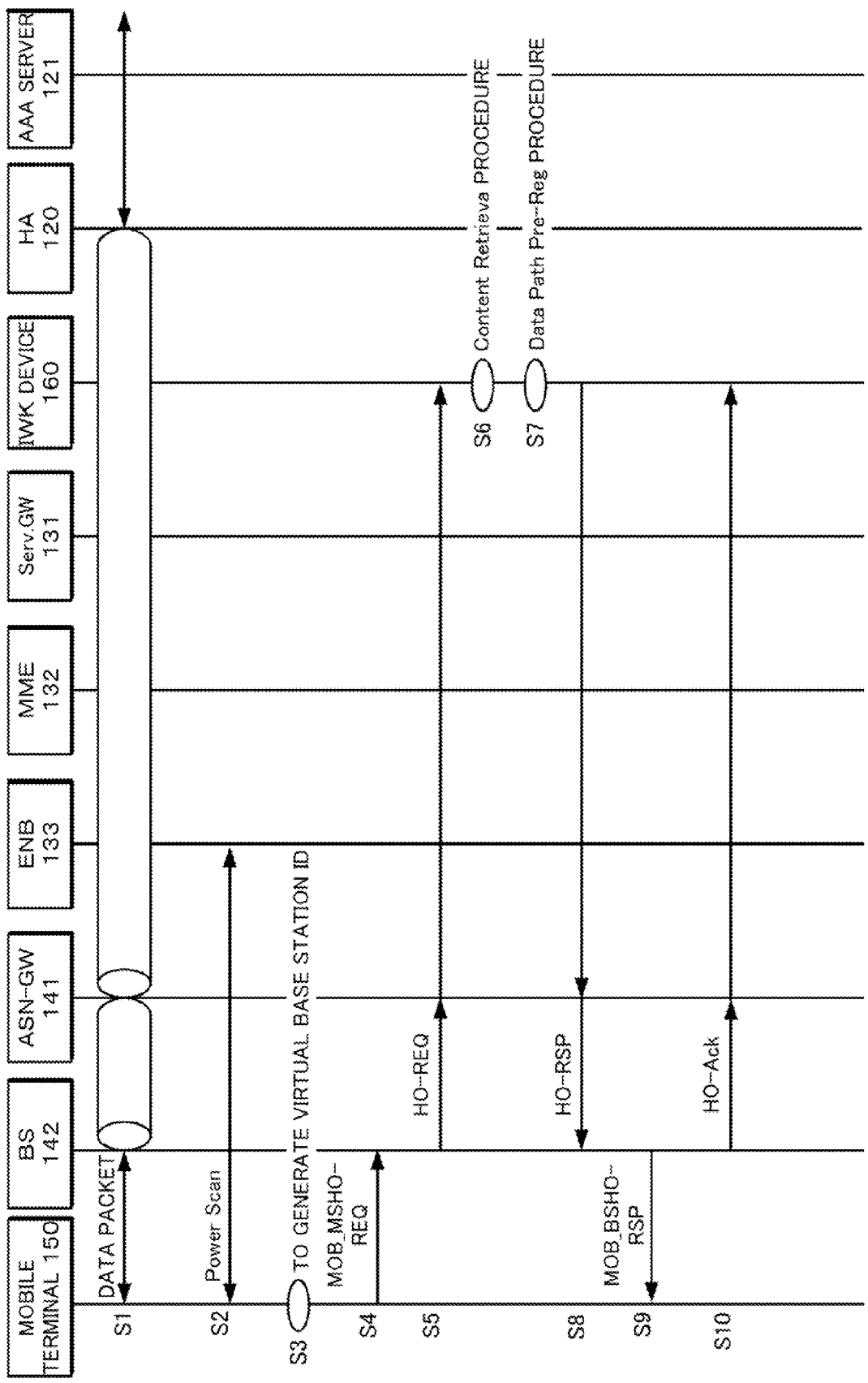
FIG. 6 is a sequence diagram (preparation phase) at the time of handover between different types of access networks in the first example according to the present invention.

In the initial state, the mobile terminal 150 communicates through the WiMAX network 112 (Step S1 in FIG. 6).

First, the mobile terminal 150 measures an electric field intensity of a link with an adjacent base station in order to search for a handover destination candidate (Step S2).

As a result of link electric field intensity measurement, the ENB 133 of the LTE network 111 is newly found as a candidate base station of a handover destination.

The mobile terminal 150 generates a virtual base station ID of the ENB 133 from a base station ID of the ENB 133 by its held conversion function in order to obtain a virtual base station ID of the ENB 133 which can be used in the WiMAX network 112 (Step S3).

In order to determine whether handover between different types of access networks to the ENB 133 based on a link electric field intensity or the like, the mobile terminal 150 transmits an MOB_MSHO-REQ message which is an HO request message to the BS 142 (Step S4).

The MOB_MSHO-REQ message includes the virtual base station ID of the ENB 133 obtained at Step S3 as base station information that the mobile terminal 150 considers as a handover destination candidate.

Upon receiving the MOB_MSHO-REQ message, the BS 142 transmits an HO-REQ message to the ASN-GW 141 as its own host anchor node (Step S5).

The ASN-GW 141 determines that it is handover requiring relocation of the ASN-GW from the virtual base station ID of the ENB 133 as handover destination base station information to transmit the HO-REQ message to the IWK device 160.

Here, it is necessary to make the ASN-GW which manages the ENB 133 be seen as the IWK device 160 from the ASN-GW 141.

It is therefore necessary to indicate, in a data base for the ASN-GW 141 to solve, from the virtual base station ID of the ENB 133, its host ASN-GW, that the ASN-GW of the ENB 133 is the IWK device 160.

Possible as a data base recited here are, for example, a local data base in the ASN-GW 141 and a data base in a DNS server for solving an ASN-GW address.

Upon receiving the HO-REQ message, the IWK device 160 executes a Context Retrieval procedure (Step S6) and a Data Path Pre-Reg procedure (Step S7).

Thereafter, the IWK device 160 transmits the HO-RSP message to the BS 142 (Step S8).

Upon receiving the HO-RSP message, the BS 142 transmits an MOB_BSHO-RSP message in order to notify the mobile terminal 150 of base station information which can be handed over.

The MOB_BSHO-RSP message includes the virtual base station ID of the ENB 133.

At the last of the Preparation Phase, the BS 142 transmits an HO-Ack message (Step S10).

When the mobile terminal 150 selects a base station which is to be ultimately handed over from among base station information included in the MOB_BSHO-RSP message, the processing shifts to the Action Phase.

In this sequence, the mobile terminal 150 selects the ENB 133 as a base station of a handover destination.

Next, a procedure of the Action Phase will be described with reference to FIG. 7.

Figure 7:
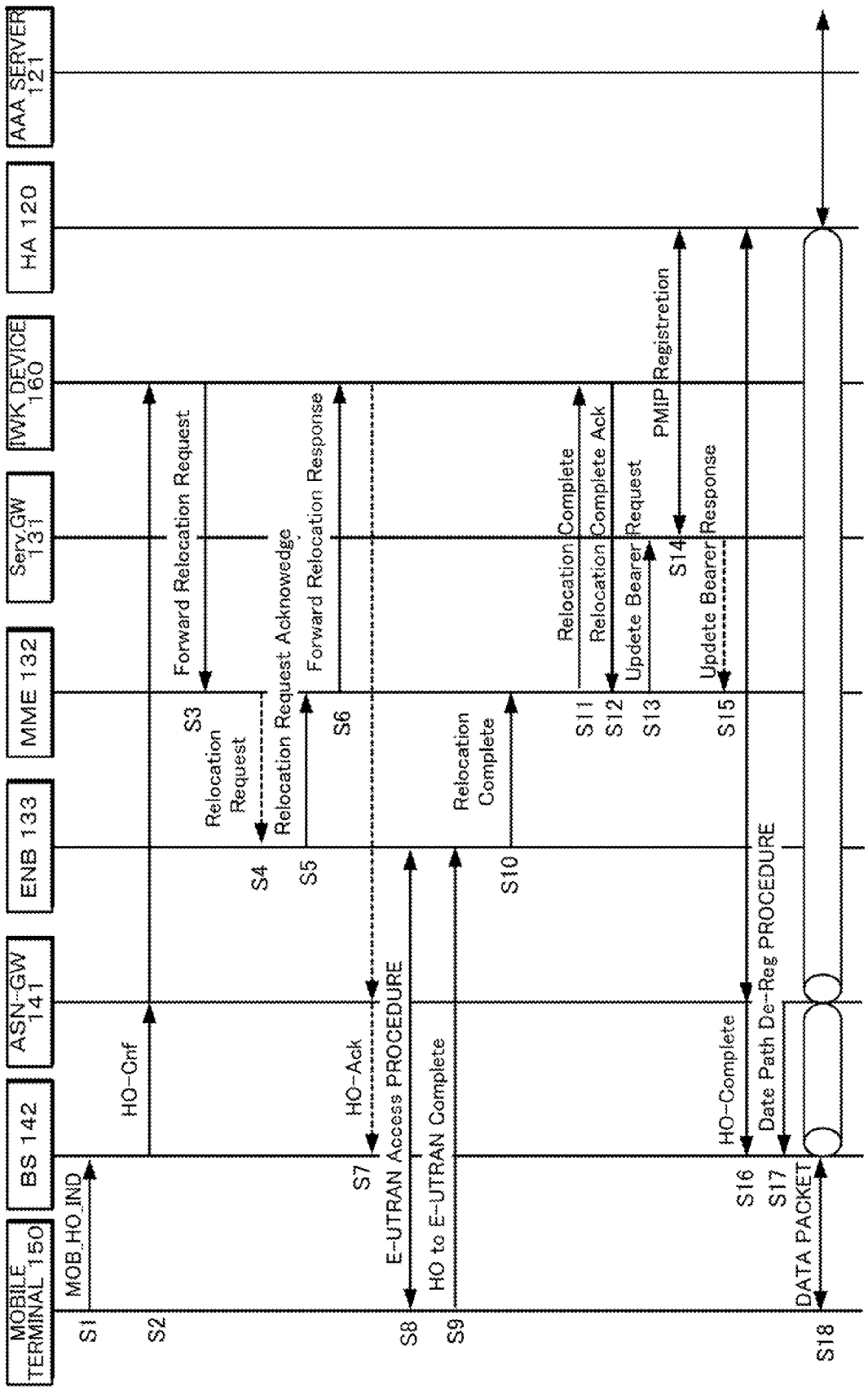
FIG. 7 is a sequence diagram (action phase) at the time of handover between different types of access networks in the first example according to the present invention.

When selecting the ENB 133 as a base station which is to be ultimately handed over from among base station information included in the MOB_BSHO-RSP message of the Preparation Phase, the mobile terminal 150 transmits an MOB_HO_IND message to the BS 142 (Step S1 in FIG. 7).

The MOB_HO_IND message includes the virtual base station ID of the ENB 133.

Upon receiving the MOB_HO_IND message, the BS 142 transmits an HO-Cnf message to the IWK device 160 through the ASN-GW 141 as its own host anchor node (Step S2).

The IWK device 160 determines that the HO-Cnf message should be converted into a Forward Relocation Request from the virtual base station ID of the ENB 133 included in the HO-Cnf message and transferred to the ENB 133.

Then, after converting the HO-Cnf message into the Forward Relocation Request, transmit the obtained request to the MME 132 (Step S3).

The MME 132 transmits a Relocation Request to the ENB 133 and receives a Relocation Request Acknowledge as its response (Steps S4 and S5).

Then, the MME 132 transmits a Forward Relocation Response to the IWK device 160 (Step S6).

When receiving the Forward Relocation Response, the IWK device 160 converts the response into an HO-Ack message and transmits the message to the BS 142 (Step S7).

On the other hand, after transmitting the MOB_HO_IND message at Step S1, the mobile terminal 150 connects with the ENB 133 (Step S8).

After a linkage with the ENB 133 is established, the mobile terminal 150 transmits an HO Complete message to the ENB 133 (Step S9).

Upon receiving the HO Complete message, the ENB 133 transmits a Relocation Complete message to the IWK device 160 through the MME 132 (Steps S10 and S11).

Upon receiving the Relocation Complete message, the IWK device 160 returns a Relocation Complete Ack message to the MME 132 (Step S12).

Upon receiving the Relocation Complete Ack message, the MME 132 transmits an Update Bearer Request message to the Serving GW 131 in order to re-set up a tunnel for data packet transfer (Step S13).

Upon receiving the Update Bearer Request message, the Serving GW 131 executes PMIP Registration with respect to the HA 120 (Step S14).

After the completion of the PMIP Registration, the Serving GW 131 transmits an Update Bearer Response message to the MME 132 (Step S15).

In addition, after transmitting the Relocation Complete Ack message at Step S12, the IWK device 160 transmits the HO-Complete message to the BS 142 through the ASN-GW 141 in order to delete an old data path (Step S16).

Thereafter, delete a data path between the ASN-GW 141 and the BS 142 (Step S17).

As a result of the foregoing procedure, the mobile terminal 150 is allowed to communicate through the LTE network 111 (Step S18).

Next, a second example of the present invention will be described with reference to the drawings. The second example corresponds to the second exemplary embodiment of the present invention.

Figure 8:
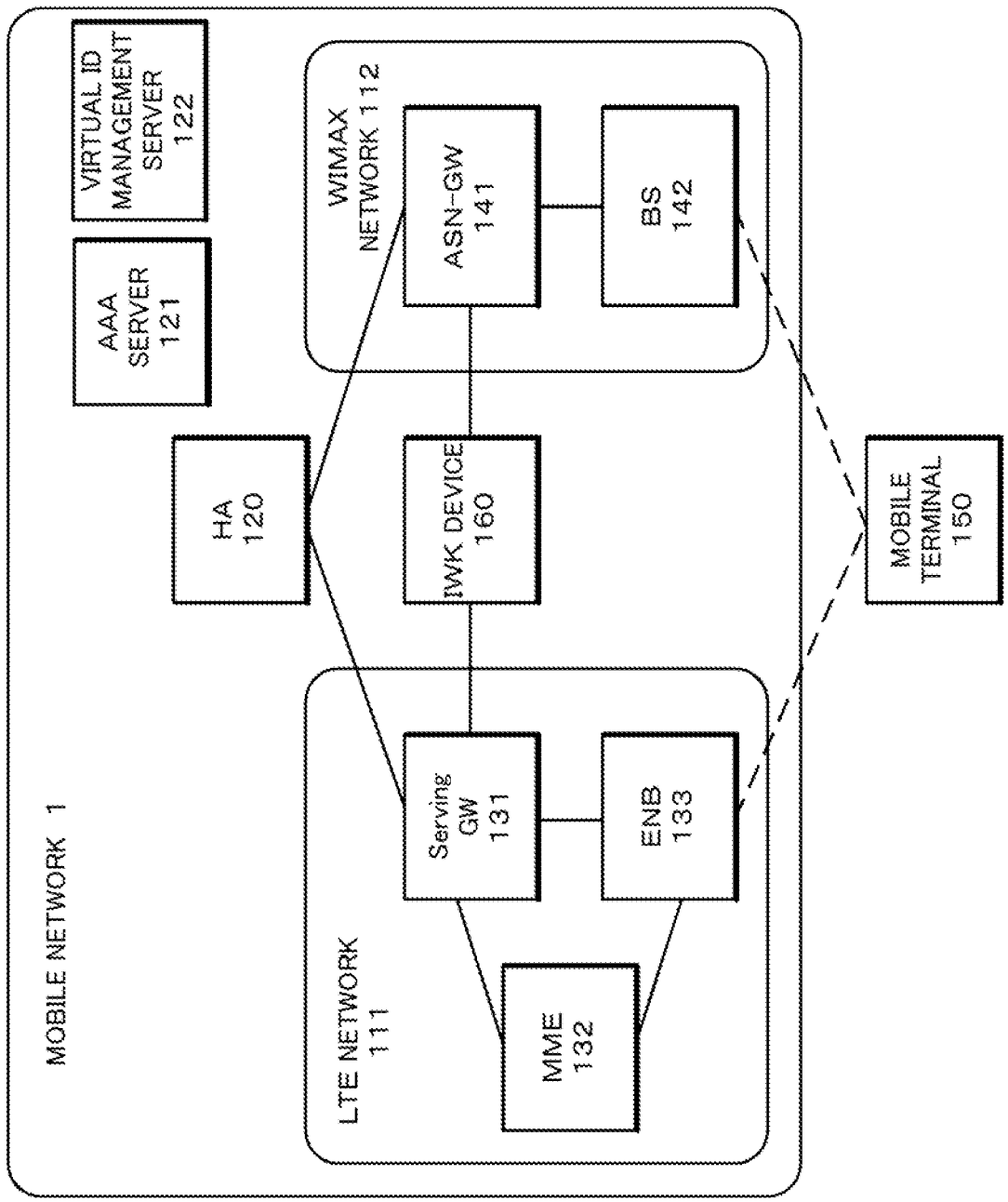
FIG. 8 is a block diagram showing a structure of a second example according to the present invention.

With reference to FIG. 8, the second example of the present invention comprises the mobile network 1 and the mobile terminal 150.

The difference from the first example is that a virtual ID management server 122 is added to the mobile network 1.

Since the LTE network 111, the Serving GW 131, the MME 132, the ENB 133, the WiMAX network 112, the ASN-GW 141, the BS 142, the HA 120, the AAA server 121 and the IWK device 160 are the same as the elements of the first example, no detailed description will be made thereof.

The virtual ID management server 122, which is a server that manages a correspondence relationship between a base station ID used in each access network and a virtual base station ID usable in a different access network, returns a base station ID included in a request message and a virtual base station ID according to information of an access network of a handover source in response to an inquiry from the mobile terminal 150.

The mobile terminal 150, which is a terminal having performance of connection to both of the LTE network 111 and the WiMAX network 112, executes communication by using an IP address belonging to the HA 120. The mobile terminal 150 has a client function of inquiring of the virtual ID management server 122 to solve a virtual base station ID from a base station ID.

Next, with reference to FIG. 8 and the flow chart of FIG. 9, detailed description will be made of operation of handover between different types of access networks from the WiMAX network 112 to the LTE network 111 according to the present exemplary embodiment.

Figure 9:
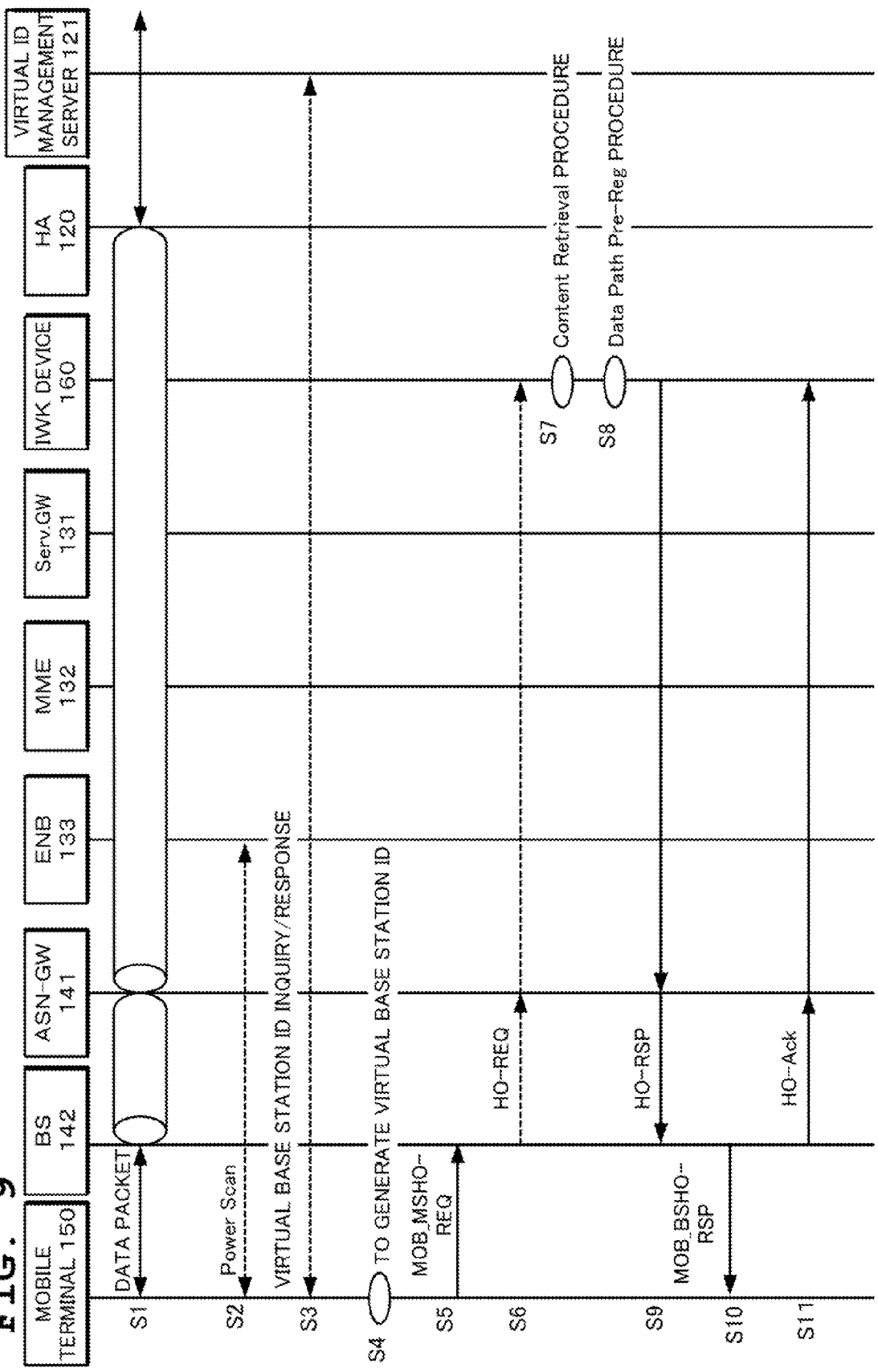
FIG. 9 is a sequence diagram (preparation phase) at the time of handover between different types of access networks in the second example according to the present invention.
Figure 10:
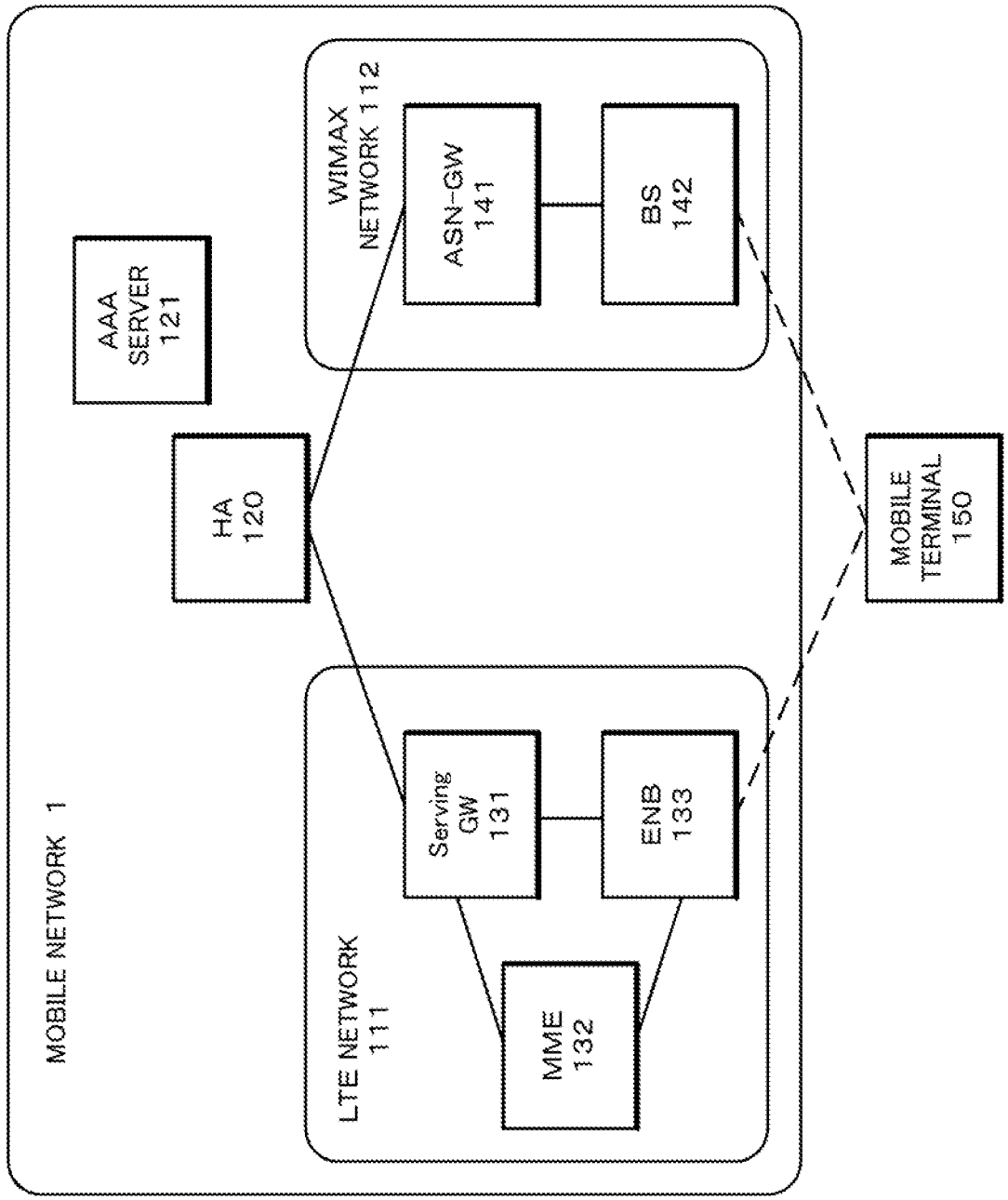
FIG. 10 is a block diagram showing a structure according to related art.

Since Steps S1 and S2 in FIG. 9 are the same as the corresponding steps in FIG. 7 according to the first example, no description will be made thereof.

When determining execution of handover between different types of access networks to the ENB 133 based on a link electric field intensity or the like, the mobile terminal 150 inquires about a virtual base station ID in order to obtain a virtual base station ID of the ENB 133 which can be used in the WiMAX network 112 (Step S3).

A virtual base station ID inquiry message transmitted from the mobile terminal 150 includes, as an information element, a base station ID of the ENB 133 and an access kind of the currently connected WiMAX network 112 which is a handover source.

The virtual ID management server 122 searches its own data base for a base station ID and a virtual base station ID according to a kind of access and transmits a response message to the mobile terminal 150.

A method of solving an address of the virtual ID management server 122 by the mobile terminal 150 can be realized by preconfiguration or DHCP at the time of start-up.

Since procedures following Step S4 in FIG. 9 are the same as those of the first example, no detailed description will be made thereof.

While in the present exemplary embodiment, every time a new base station ID is found, an inquiry is made to the virtual ID management server 122, information returned by the virtual ID management server 122 may be a correspondence list of areas where the mobile terminal 150 exists. Returning such a correspondence list generates an advantage that the number of inquiries of the virtual ID management device 22 can be reduced.

While in the first and second examples, handover between an LTE network and a WiMAX network is recited as an example, handover is applicable between access networks such as a UTRAN (UMTS Terrestrial Radio Access Network) network, a CDMA 2000 (Code Division Multiple Access 2000) network and a UMB (Ultra Mobile Broadband) network and is not limited to a specified kind of access network in particular.

Also in the first and second examples, the IWK device 160 is described as one device, the IWK device 160 may be incorporated as one function of other device (e.g. the Serving GW 131, the MME 132 or the ASN-GW 141).

Although the present invention has been described with respect to the preferred modes of implementation and exemplary embodiments in the foregoing, the present invention is not necessarily limited to the above-described modes of implementation and exemplary embodiments and can be implemented in various modifications without departing from the scope of their technical ideas.

INDUSTRIAL APPLICABILITY

The present invention is applicable to such use as a mobile network which provides handover between different types of access networks.

What is claimed is:

1. A mobile communication system which accommodates different types of access networks, comprising:
   an interwork device having a unit which manages information of correspondence between a base station ID for identifying a base station of an access network of a handover destination and a virtual base station ID for identifying the base station in an access network of a handover source whose ID space is different, and a unit which executes protocol conversion based on said correspondence information, and
   a mobile terminal having a unit which solves said virtual base station ID from said base station ID and a unit which executes handover between different types of access networks by using said virtual base station ID,
   wherein the unit which solves a virtual base station ID from said base station ID of said mobile terminal solves said virtual base station ID based on one of:
   mapping information which correlates said base station ID set in said mobile terminal and a virtual base station ID;
   a predetermined conversion rule set in said mobile terminal.

2. A mobile communication system which accommodates different types of access networks, comprising:
   an interwork device having a unit which manages information of correspondence between a base station ID for identifying a base station of an access network of a handover destination and a virtual base station ID for identifying the base station in an access network of a handover source whose ID space is different, and a unit which executes protocol conversion based on said correspondence information;

a mobile terminal having a unit which solves said virtual base station ID from said base station ID and a unit which executes handover between different types of access networks by using said virtual base station ID; and a virtual ID management server having a unit which manages information of correspondence between said virtual base station ID and said base station ID and a unit which returns information of said virtual base station ID in response to an inquiry from said mobile terminal, wherein the unit which solves said virtual base station ID from said base station ID of said mobile terminal solves said virtual base station ID by an inquiry to said virtual ID management server, and the unit of said virtual ID management server which returns virtual base station ID information in response to an inquiry from said mobile terminal returns a mapping list which correlates a base station ID in a surrounding area corresponding to position information whose inquiry is made by said mobile terminal and a virtual base station ID.

3. A method of handover between different types of access networks in a mobile communication system which accommodates different types of access networks, wherein an interwork device executes protocol conversion based on information about correspondence between a base station ID for identifying a base station of an access network of a handover destination and a virtual base station ID for identifying the base station in an access network of a handover source whose ID space is different, and a mobile terminal solves said virtual base station ID from said base station ID to execute handover between different types of access networks by using said virtual base station ID, wherein said mobile terminal solves said virtual base station ID based on one of:

mapping information which correlates said base station ID set in said mobile terminal and a virtual base station ID;

a predetermined conversion rule set in said mobile terminal.

4. A method of handover between different types of access networks in a mobile communication system which accommodates different types of access networks, wherein an interwork device executes protocol conversion based on information about correspondence between a base station ID for identifying a base station of an access network of a handover destination and a virtual base station ID for identifying the base station in an access network of a handover source whose ID space is different, and a mobile terminal solves said virtual base station ID from said base station ID to execute handover between different types of access networks by using said virtual base station ID, wherein said mobile terminal solves said virtual base station ID by making an inquiry to a virtual ID management server which manages information of correspondence between said virtual base station ID and said base station ID, and wherein said virtual ID management server returns a mapping list which correlates a base station ID in a surrounding area corresponding to position information whose inquiry is made by said mobile terminal and a virtual base station ID.

5. A mobile terminal which connects to a different type of access network on a mobile communication system which accommodates different types of access networks, comprising:

a unit which solves, from a base station ID for identifying a base station of an access network of a handover destination, a virtual base station ID for identifying the base station in an access network of a handover source whose ID space is different, and a unit which executes handover between different types of access networks by using said virtual base station ID, wherein the unit which solves a virtual base station ID from said base station ID solves said virtual base station ID based on one of:

mapping information which correlates said base station ID set in the mobile terminal and the virtual base station ID;

a predetermined conversion rule set in the mobile terminal.

6. A server on a mobile communication system which accommodates different types of access networks, comprising:

a unit which manages information of correspondence between a base station ID for identifying a base station of an access network of a handover destination and a virtual base station ID for identifying the base station in an access network of a handover source whose ID space is different, and a unit which returns virtual base station ID information in response to an inquiry from the mobile terminal, wherein the unit which returns virtual base station ID information in response to an inquiry from said mobile terminal returns a mapping list which correlates a base station ID in a surrounding area corresponding to position information whose inquiry is made by the mobile terminal and a virtual base station ID.

* * * * *